(12) United States Patent
Allen

(10) Patent No.: US 9,852,595 B2
(45) Date of Patent: Dec. 26, 2017

(54) PHOTO COMPARISON AND SECURITY PROCESS CALLED THE FLICKER PROCESS

(71) Applicant: Dann M Allen, Hartford City, IN (US)

(72) Inventor: Dann M Allen, Hartford City, IN (US)

( * ) Notice: Subject to any disclaimer, the term of this patent is extended or adjusted under 35 U.S.C. 154(b) by 0 days.

(21) Appl. No.: 14/846,756

(22) Filed: Sep. 5, 2015

(65) Prior Publication Data

US 2016/0189499 A1    Jun. 30, 2016

Related U.S. Application Data

(60) Provisional application No. 62/053,378, filed on Sep. 22, 2014.

(51) Int. Cl.
*G06K 9/00* (2006.01)
*G08B 13/196* (2006.01)

(52) U.S. Cl.
CPC ... *G08B 13/19604* (2013.01); *G06K 9/00771* (2013.01)

(58) Field of Classification Search
None
See application file for complete search history.

(56) References Cited

U.S. PATENT DOCUMENTS

| | | | |
|---|---|---|---|
| 6,427,022 B1 * | 7/2002 | Craine | A61B 5/0059 128/922 |
| 8,275,449 B2 | 9/2012 | White et al. | |
| 8,948,846 B2 | 2/2015 | Pan | |
| 2006/0210132 A1 * | 9/2006 | Christiansen, II | A61B 5/0059 382/128 |
| 2008/0077510 A1 | 3/2008 | Dielemans | |
| 2009/0087046 A1 * | 4/2009 | Kuhn | A61B 5/00 382/128 |
| 2009/0135254 A1 * | 5/2009 | Chiang-Lin | G01S 3/7864 348/169 |
| 2010/0225765 A1 * | 9/2010 | Kadogawa | H04N 7/181 348/159 |

* cited by examiner

*Primary Examiner* — Delomia L Gilliard
(74) *Attorney, Agent, or Firm* — Ritchison Law Offices, PC; John D Ritchison

(57) ABSTRACT

A monitoring support apparatus which supports a monitoring system using a comparison method for real time and archived film and/or photographs. It relates to image capturing devices and, particularly, to an image capturing device which can automatically compare photographs and/or film and compare the differences in a selected time or an archive to a present situation. This relates to systems for video viewing/monitoring films or photographs and determining what changes have occurred. The process comprises: a general Flicker Process: Step 1: Establish Photograph/Film baseline; Step 2: Select comparison Photograph/Film Future or Past; Step 3: Time Lapse between the baseline and a comparison frame; Step 4: Contrast Base and Comparison Selected Computer App/Streaming/etc.; Step 5: Flash/Color/Highlight/"Box-In"/Ghost etc. differences; Step 6: Record/Save Contrasted Comparison; and Step 7: Take Action: Report, Respond, Call Authorities, or other.

16 Claims, 19 Drawing Sheets

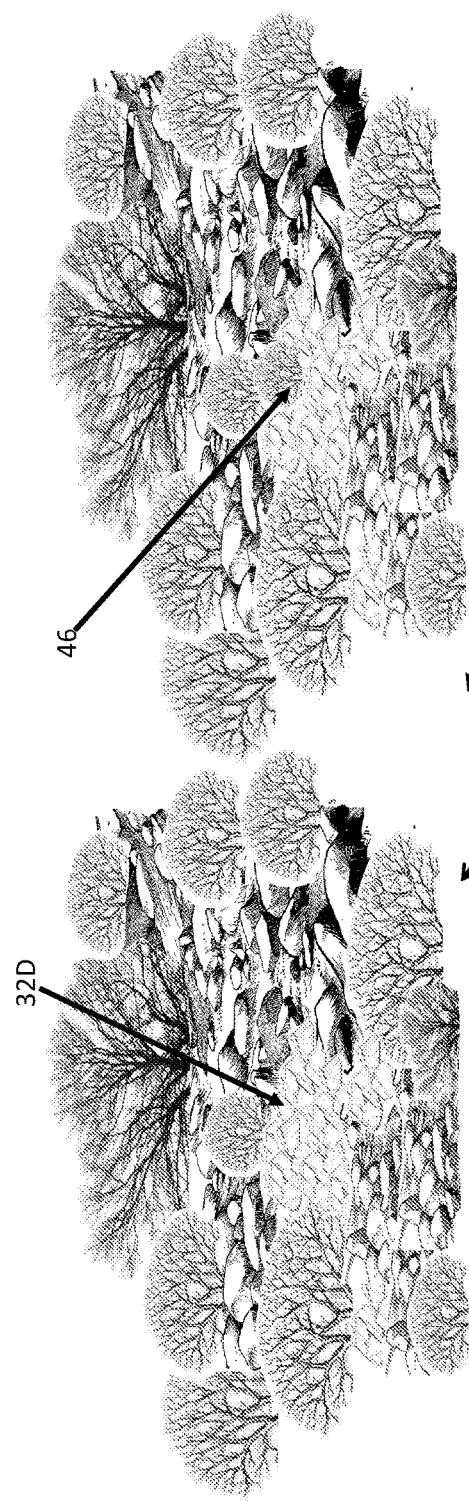
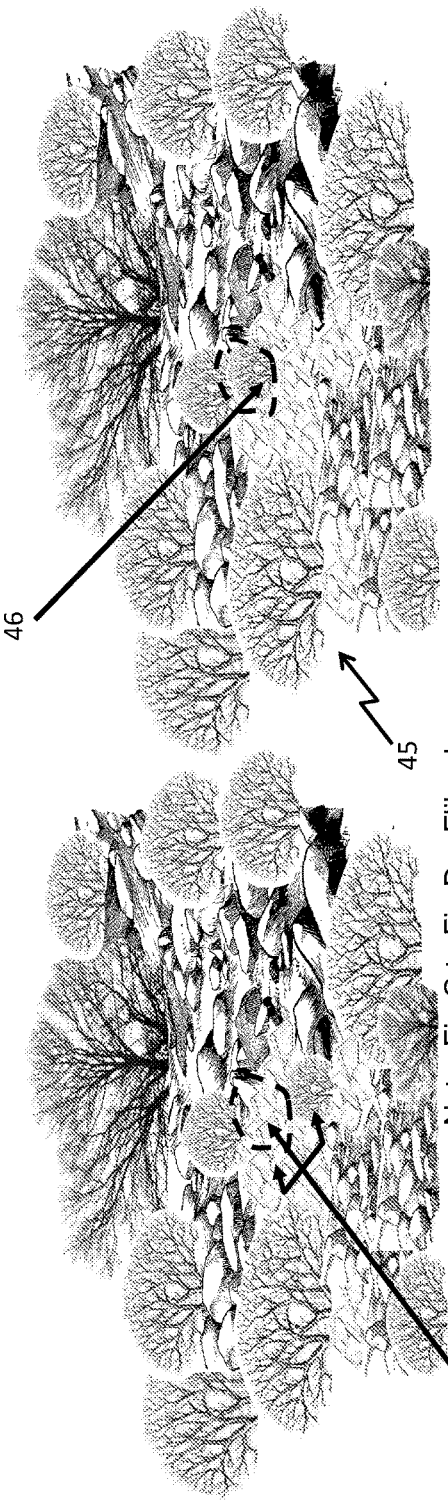
Fig. 8 A
Fig. 8 B
Note: Fig A to Fig B-C –
Flikr shows Extra Bush
Fig. 8 C
Fig. 8 D   Note: Fig C to Fig D – Flikr shows
Extra Bush Moved overnight

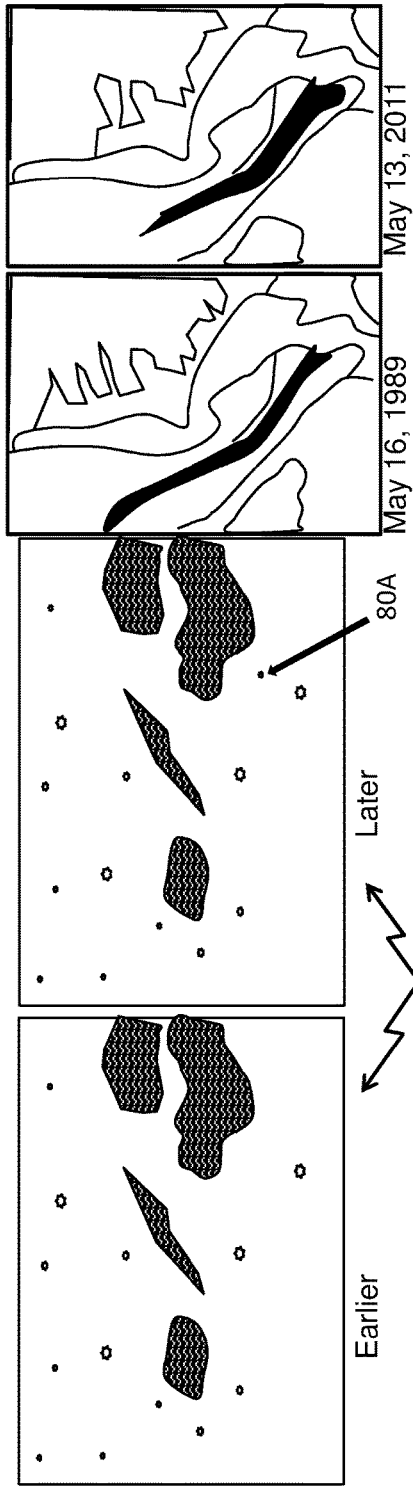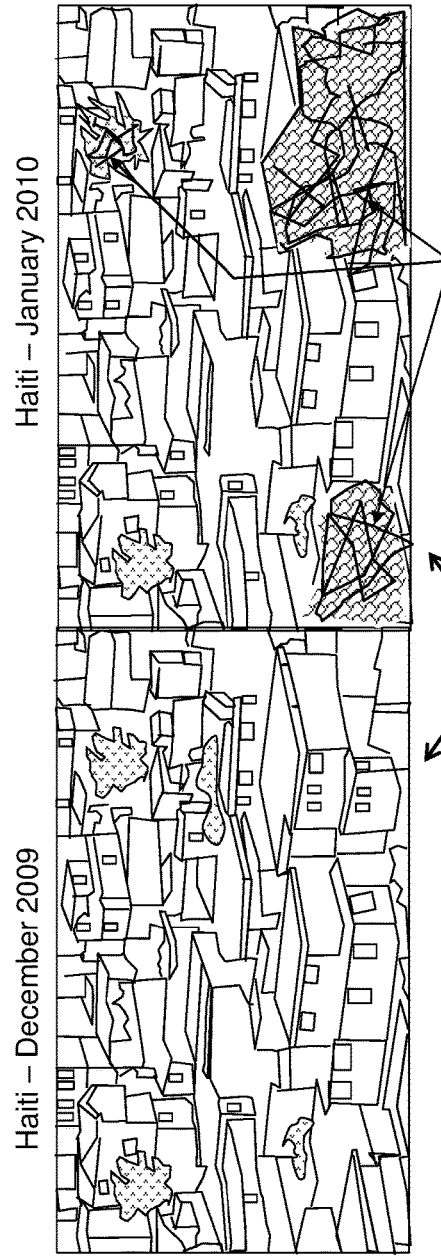

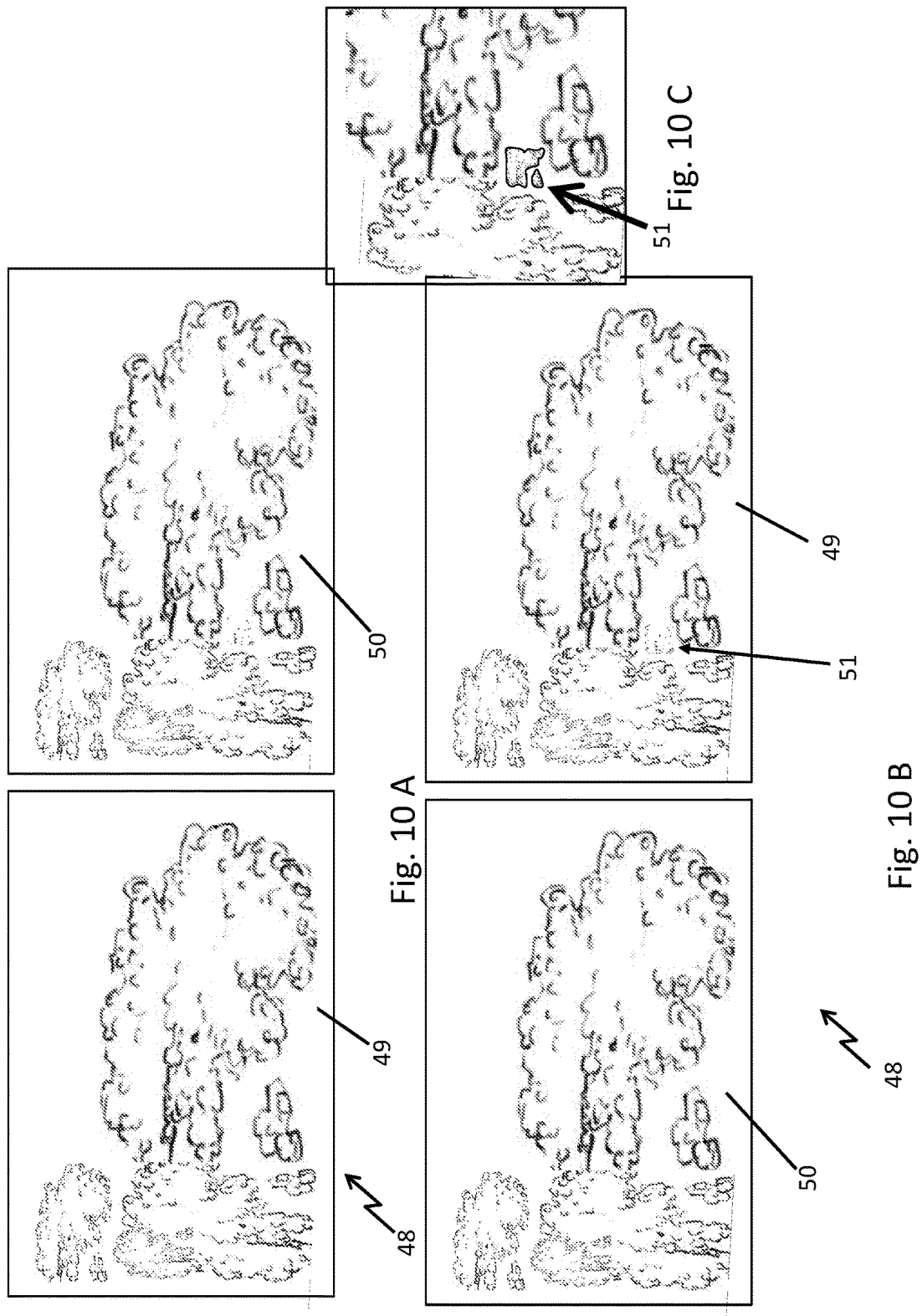

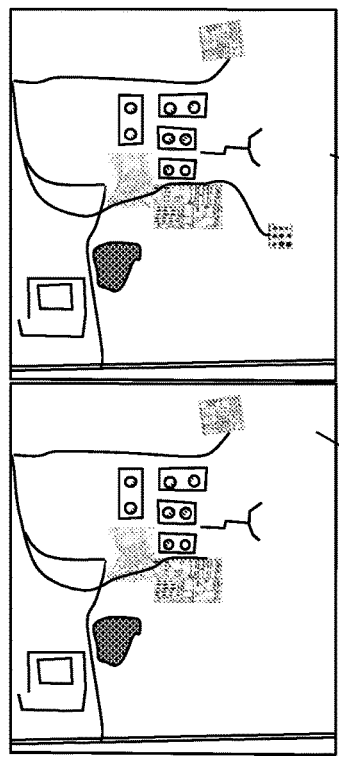
Fig. 10 D
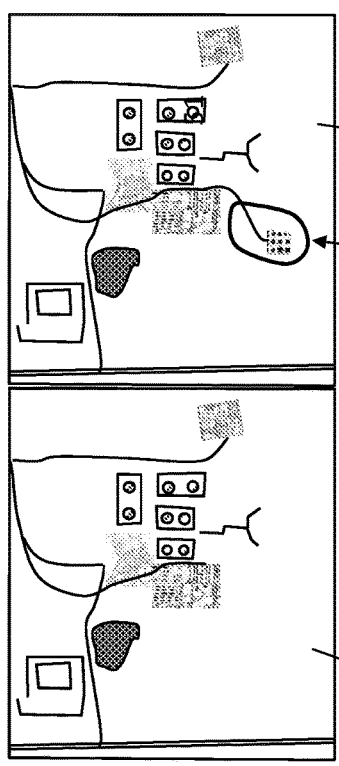
Fig. 10 E
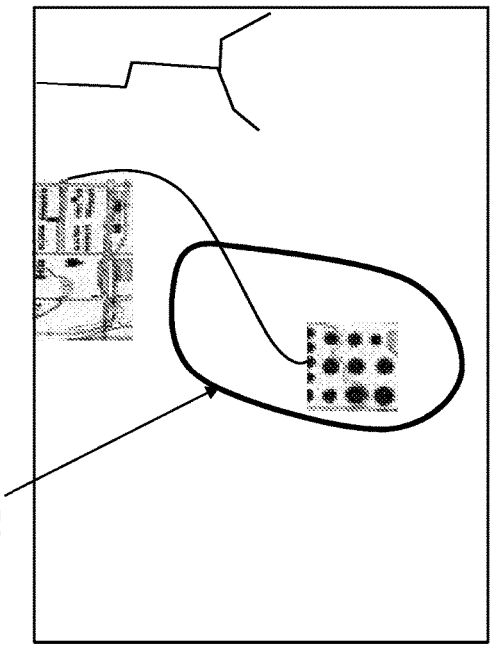
Fig. 10 G
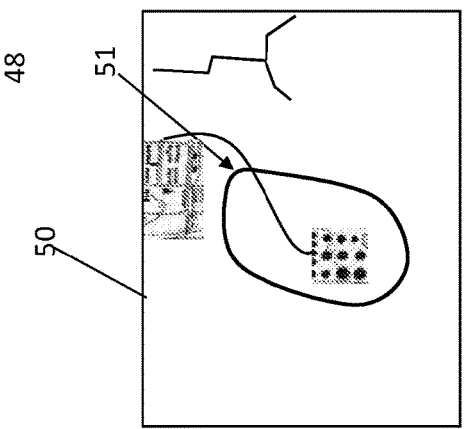
Fig. 10 F
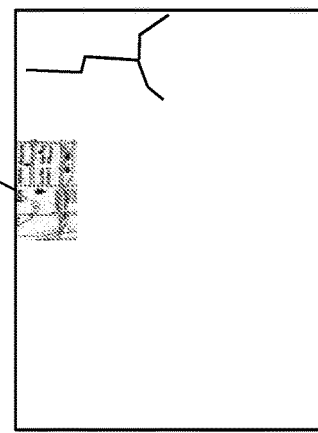

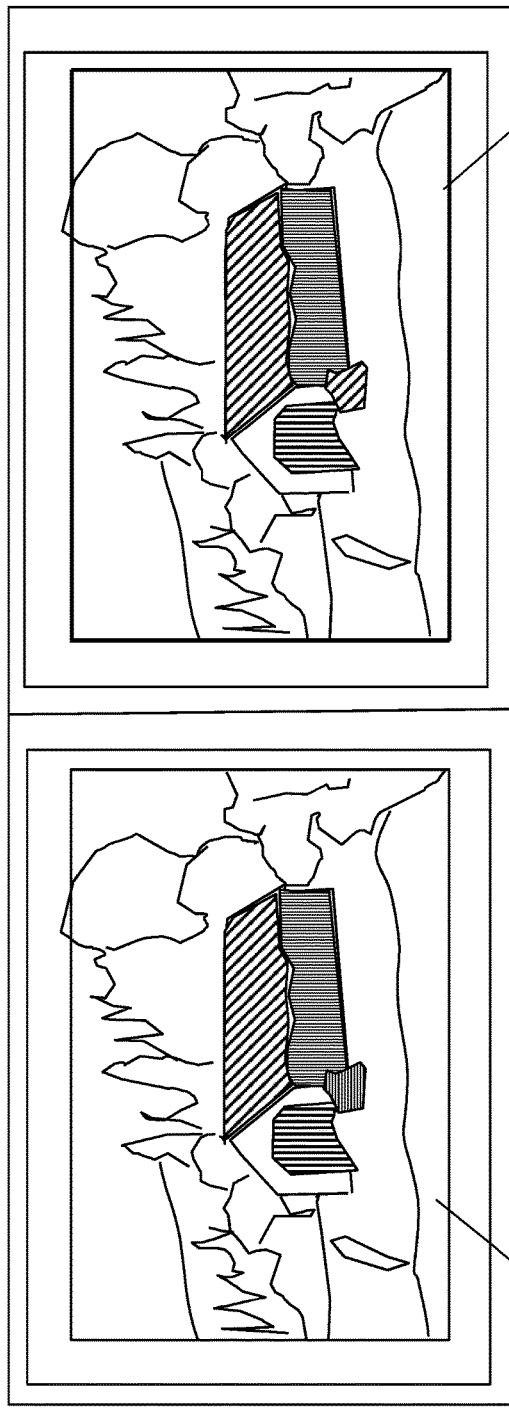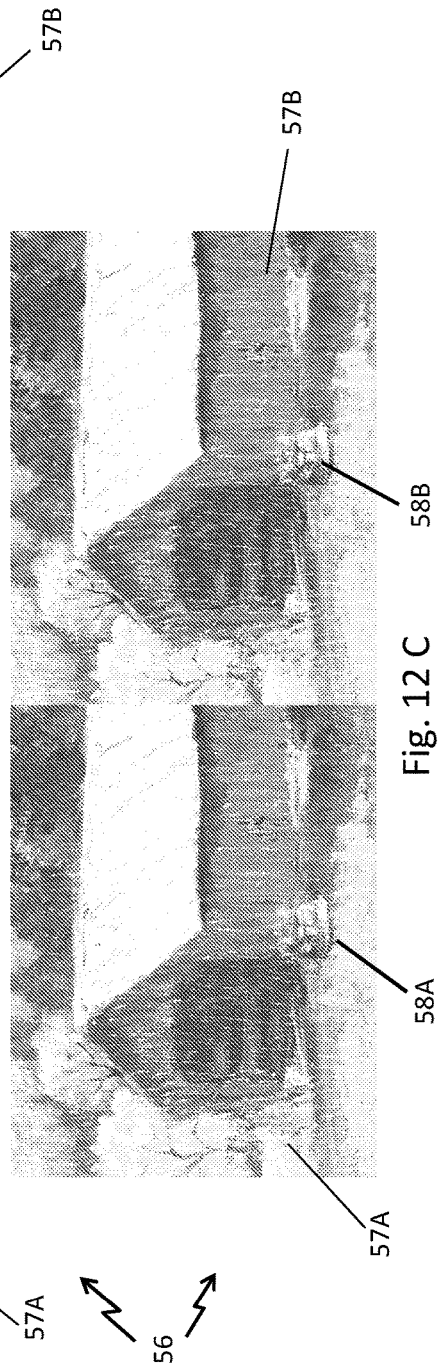
Fig. 12 A
Fig. 12 B
Fig. 12 C
Note: A mimic microscope scan of the original painting is compared with the fake

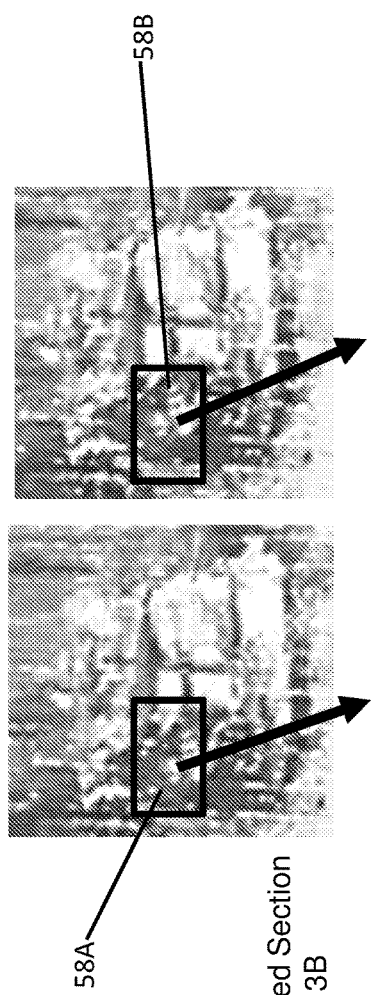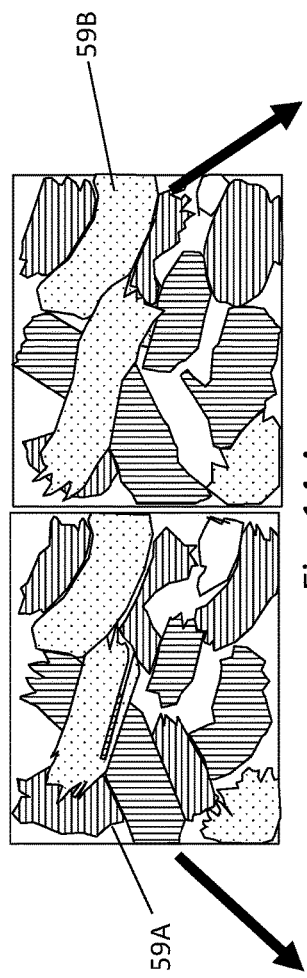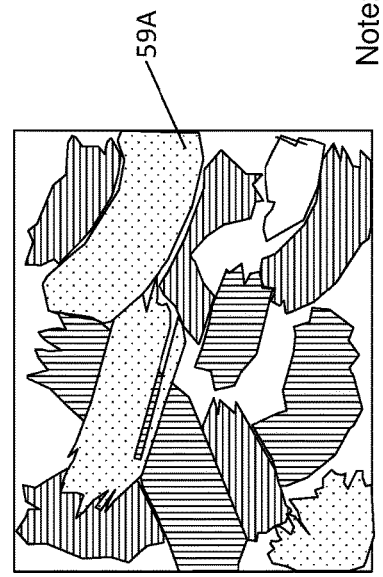
Fig. 14 A
Fig. 14 B
Fig. 14 C
Note: Enlarged Section is from Fig. 13B
Note: These are Steps of tracking Forgeries 56

COMPARISON

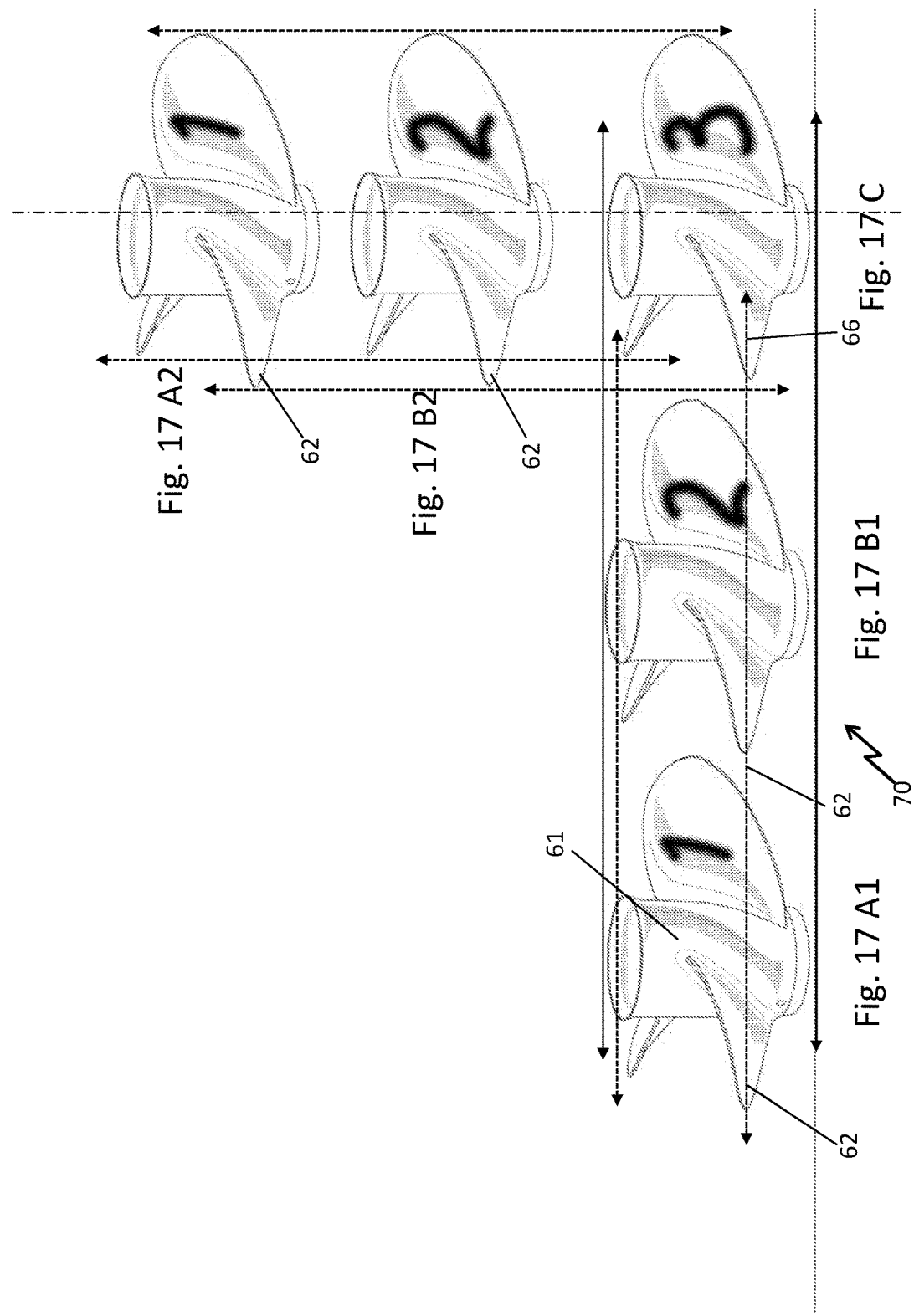

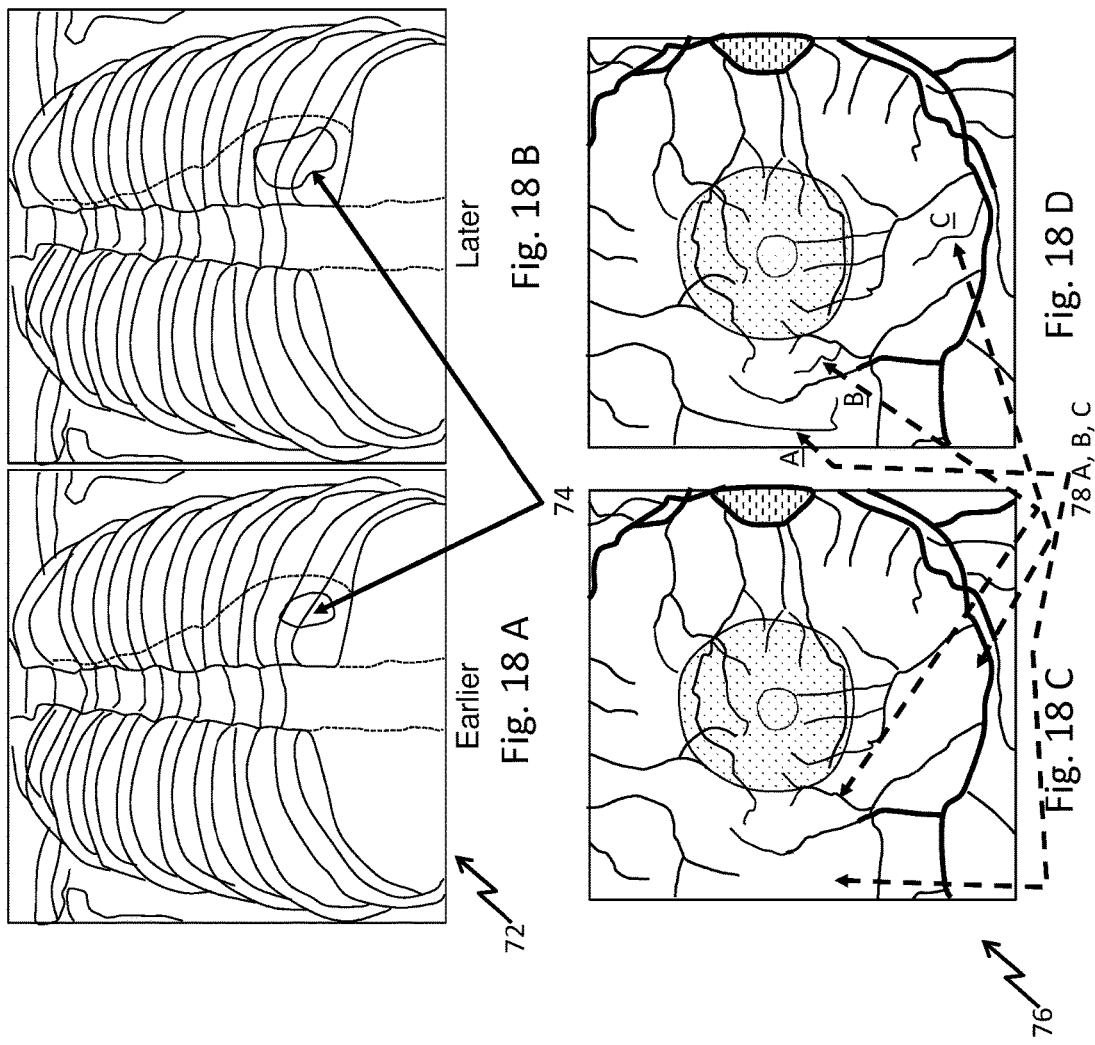

PHOTO COMPARISON AND SECURITY PROCESS CALLED THE FLICKER PROCESS

CROSS-REFERENCE TO RELATED APPLICATIONS

This application claims the benefit of U.S. Provisional Patent Application Ser. No. 62/053,378 filed Sep. 22, 2014 by Dann M. Allen and entitled "A photo comparison and security process called the Flicker Process".

FIELD OF INVENTION

The present invention relates to a monitoring support apparatus which supports a monitoring system using a comparison method for real time and archived film and/or photographs. The present invention relates to image capturing devices and, particularly, to an image capturing device which can automatically compare photographs and/or film and compare the differences in a selected time or an archive to a present situation. With the development of optical imaging technology, image capturing devices are widely used now. People use image capturing devices to take not only pictures of stationary objects, but also but also pictures of moving objects. The present invention relates to systems for video viewing/monitoring films or photographs and determining what changes have occurred.

BACKGROUND

Field of Invention and Prior Art

Most image capturing devices cannot follow an object in motion, and must be directed by a user to do so. The problem is that users may have difficulty tracking a moving object accurately to capture an image with desired quality. What is needed, therefore, is an image capturing device which can automatically track a change or discrepancy in a moving object.

Monitoring for a building, a facility, or the like is performed by displaying a video image shot by a camera on a monitor. However, readily seeing the changes is dependent on subjective human reaction and perception. The current photo comparison and security process called the Flicker Process removes the subjective review and provides an objective comparison with an easily seen flicker of the changes.

Prior Art

As far as known there are no other devices or process that perform the function of the photo comparison and security process called the Flicker Process. A U.S. Pat. No. 8,275,449 issued to White, et al and entitled "Overlay image contrast enhancement" shows a method of creating an image difference overlay comprises identifying a loop of reference images of a subject and identifying a loop of data images of the subject. The loop of image data can be identified after an event, such as the administration of contrast agent to the subject. A reference loop image frame is compared to one or more data loop image frames and the reference loop frame is associated with a data loop image frame which closely resembles the data loop image frame. Each of the associated frames can then be processed and used to create an image difference overlay frame. Another U.S. Pat. No. 8,948,846 issued to Pan in 2015 and entitled "Optical coherence tomography systems and methods" demonstrated generally features a method that includes using an optical coherence tomography system to acquire a plurality of frames of a sample where each frame includes optical information about the composition of the sample through a section of the sample. The method further includes averaging over two or more of the frames to provide an image of the section of the sample where successive frames of the two or more frames are acquired with a time lapse of 0.05-0.7 seconds. Embodiments of the method may have unique advantages for endoscopic subcellular imaging. For example, they can enable subcellular imaging with low-NA optics (e.g., NA=0.25 or less) while providing morphological imaging of the underlying tissue up to 0.6 mm without focal tracking.

A U.S. published patent application 20080077510 by Dielemans in 2008 was entitled "Method and System For Providing Security Surveillance And Shelf Monitoring Functions'. Here is taught a system and a method for providing shelf monitoring functions to a retail system including a video-based security system such that both the security and the current product distribution in a product storage area are monitored using the same video camera network. The method includes acquiring a video image of at least a portion of at least one shelf using at least one video camera mounted in a fixed location and directing the video image to a shelf monitoring module of a processing system and to a security module of the processing system. Another published application 20090135254 by CHIANG-LIN in 2009 entitled "IMAGE CAPTURING DEVICE AND METHOD FOR TRACKING OBJECT OF SAME" provided an image capturing device includes a main body with an image capturing unit received therein, a base, a pan and tilt mechanism for rotating the main body relative to the base, a viewfinder display window, and an object tracking system. The object tracking system includes an object obtaining unit, a storing unit, a detecting unit, a calculating unit, and a driving unit. The object obtaining unit is used for selecting and obtaining an object for tracking in the viewfinder display window. The storing unit is used for storing the information of the object. The detecting unit is used for detecting the position of the object image displayed in the viewfinder display window. The calculating unit is used for calculating an amount and direction of rotation for the main body. The driving unit is used for driving the pan and tilt mechanism to rotate the main body.

Finally, another published patent application by Kadogawa was entitled "MONITORING SUPPORT APPARATUS, MONITORING SUPPORT METHOD, AND RECORDING MEDIUM'. This showed and taught a monitoring support apparatus includes an image shot information acquiring unit which acquires image shot information including a plurality of frames shot up by a plurality of cameras at different image shooting times, a difference region extracting unit which, in the pieces of image shot information acquired by the image shot information acquiring unit, compares an arbitrary frame with a frame shot at image shooting time different from that of the arbitrary frame or a background frame shot in advance to detect a region including different pixel values and extracts the detected pixel region as a difference region for each of the pieces of image shot information, and a superimposing unit which superimposes the difference regions of the pieces of image shot information extracted by the difference region extracting unit at the same time to generate one frame. Flikr was not anticipated nor obvious as to all the stated prior art. It is more simple and straightforward ad to methods and procedures used to establish the system called Flikr as the following description will show.

SUMMARY OF THE INVENTION

A monitoring support process, comprising: A general Flicker Process 30 with steps 31: Step 1: Establish [Photograph/Film] a baseline view; Step 2: Select a comparison view to a baseline view [Photograph/Film] Future or Past; Step 3: Provide a Time Lapse between the baseline vie and a comparison frame view; Step 4: Contrast Baseline view and Comparison view [Selected Computer App/Streaming/ etc.]; Step 5: Indicate with a means for identifying [Flash/Color/Highlight/"Box-In"/Ghost etc.] differences of the baseline view and the comparison view; Step 6: Record/Save Contrasted indication of differences of the Baseline view and the Comparison views; and Step 7: Take Action [Report, Respond, Call Authorities, or Other].

Objects and Advantages

Advantages and Benefits for the photo comparison and security process called the Flicker Process include:

| Item | Advantages |
|---|---|
| 1 | Provides fast recognition of changes |
| 2 | Provides a record for future use, litigation |
| 3 | Can use an existing satellite photos |
| 4 | Can use existing store/security film footage |
| 5 | Is easy to teach |
| 6 | Provides visual image and location |
| 7 | Can be real time |
| 8 | Can be archived |

DESCRIPTION OF THE DRAWINGS

Figures

The accompanying drawings, which are incorporated in and constitute a part of this specification, illustrate an embodiment of the device that is preferred. The drawings together with the summary description given above and a detailed description given below serve to explain the principles of a photo comparison and security process called the Flicker Process. It is understood, however, that the photo comparison and security process called the Flicker Process is not limited to only the precise arrangements and instrumentalities shown.

FIGS. 8 A through 8 D are sketches of landscape showing a new bush or suspected change by means of the flicker process.

FIGS. 9 A through 9 C are images of the Flicker process revealing a new star, meteor, comet, planet and etc., the Antarctic ice flows, and Haiti—before and after the earthquake.

FIGS. 10 A through 10 G are sketches of aerial surveillance application of the Flicker process for dense vegetation and desert applications.

FIGS. 11 A-11 E demonstrate precise alignment overlay and FIGS. 11 F-11 J show anatomy changes.

FIGS. 12 A through 12 C, 13 A and 13 B, 14 A though 14 C and 15 are successive blow ups using the Flicker process to track a painting or prints to show copyright infringement or forgery.

FIGS. 18 A through 18 D are using the process to compare medical records such as x-rays and eye scans that show changes such as vein or artery changes.

DESCRIPTION OF THE DRAWINGS

Reference Numerals

Figure 1:
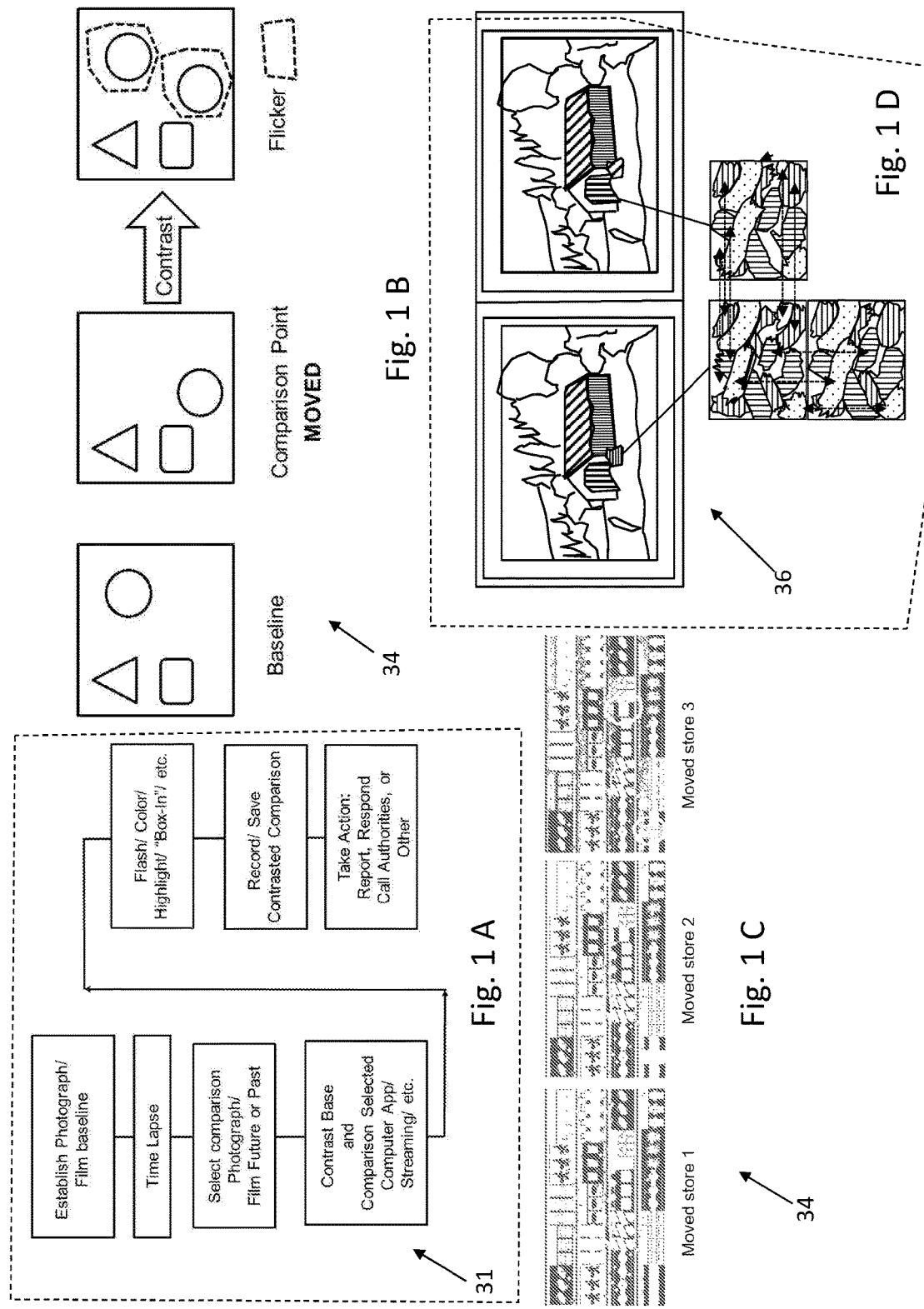
FIGS. 1 A through 1 D are sketches of the general Flicker Process concept and applications.

The following list refers to the drawings:

TABLE A

Reference numbers

| Ref # | Description |
|---|---|
| 30 | General Flicker (aka Flikr) Process 30 |
| 31 | Flicker process diagram 31 |
| 32A | Tracked object "A" 32A |
| 32B | Tracked object "B" 32B |
| 32C | Tracked object "C" 32C |
| 32D | Missing space 32D |
| 33 | Flicker denoted - flashing, ghosted, color, etc. 33 |
| 34 | Flicker tracking moved object 34 |
| 35 | Flicker tracking missing object 35 |
| 36 | Flicker process tracking copyright or forgery 36 |
| 37 | Stream of frames (real time or archived) 37 |
| 38 | Choose base line frame(s)for comparison 38 |
| 39 | Base line frame(s) 39 |
| 40 | Contrast method - repetition of baseline in a stream of future or past frames to denote/flicker 40 |
| 40A | Contrast method examples: Blink, color highlight, ghost(shift or shadow) 40A |
| 41 | Comparison frame 41 |
| 42 | Use of flicker with intruder 42 |
| 43 | Missing vase 43 |
| 44 | Missing lamp 44 |
| 45 | Landscape changes tracked 46 by flicker process 30 |
| 46 | Bush 46 |
| 47 | Missing candelabra 47 |
| 48 | Aerial changes 48 tracked by flicker process 30 |
| 49 | Base topography 49 |
| 50 | General changed topography 50 |
| 51 | Specific changes in topography 51 |
| 55 | Tracking and annotated changes or overlay 55 by the flicker process |
| 55A | Anatomy changes for the body of a person, for example a pregnant woman |
| 56 | Tracking forgeries or copyright 56 by the flicker process 30 |
| 57A | Painting A 57A |
| 57B | Painting B 57B |
| 58A | Suspected section 58A of painting A 57A |
| 58B | Suspected section 58B of painting A 57B |
| 59A | Enlarged suspect section 59A |
| 59B | Enlarged suspect section 59B |
| 60 | Comparing brush strokes 60 by flicker process 30 |
| 61 | Fan with blades 61 |
| 62 | Straight blades 62 |
| 66 | Bent blade 66 |
| 70 | Comparing mechanical positions 70 by tracking with flicker process 30 |
| 72 | Comparing medical tests x-rays, CAT and PET Scans or the like 72 by flicker process 30 |
| 74 | Medical test view of organ or anatomical parts 74 |
| 76 | Eye scans 76 |
| 78 | Vein or artery changes 78 in the eyes new as A, B, C |

TABLE A-continued

Reference numbers

| Ref # | Description |
|---|---|
| 80 | Astronomy/star changes tracked 80 by flicker process 30 |
| 80A | New Star 80A |
| 82 | Antarctic ice formations/glacier changes tracked 82 by flicker process 30 |
| 84 | Disaster changes (such as the Haiti earthquake or other devastations) tracked 84 by flicker process 30 |

DETAILED DESCRIPTION OF PREFERRED EMBODIMENT

The present invention relates to a monitoring support apparatus which supports a monitoring system using a comparison method for real time and archived film and/or photographs. The present invention relates to image capturing devices and, particularly, to an image capturing device which can automatically compare photographs and/or film and compare the differences in a selected time or an archive to a present situation. With the development of optical imaging technology, image capturing devices are widely used now. People use image capturing devices to take not only pictures of stationary objects, but also pictures of moving objects. The present invention relates to systems for video viewing/monitoring films or photographs and determining what changes have occurred.

There are shown in FIGS. 1-18 a description of the photo comparison and security process called the Flicker Process. The process is described essentially in FIGS. 1, 2 and 4. The use and operation is described and shown in FIG. 3 and FIGS. 5 through 18. The various example uses are in the operation and use section, below.

The advantages and benefits include, but are not limited to:
 A. Provides fast recognition of changes
 B. Provides a record for future use, litigation
 C. Can use an existing satellite photos
 D. Can use existing store/security film footage
 E. Is easy to teach
 F. Provides visual image and location
 G. Can be real time
 H. Can be archived The accompanying drawings, which are incorporated in and constitute a part of this specification, illustrate a preferred embodiment and examples of uses. The preferred embodiment is: A monitoring support process, comprising: A general Flicker Process 30 with steps 31: Step 1: Establish [Photograph/Film] a baseline view; Step 2: Select a comparison view to a baseline view [Photograph/Film] Future or Past; Step 3: Provide a Time Lapse between the baseline vie and a comparison frame view; Step 4: Contrast Baseline view and Comparison view [Selected Computer App/Streaming/etc.]; Step 5: Indicate with a means for identifying [Flash/Color/Highlight/"Box-In"/Ghost etc.] differences of the baseline view and the comparison view; Step 6: Record/Save Contrasted indication of differences of the Baseline view and the Comparison views; and Step 7: Take Action [Report, Respond, Call Authorities, or Other].

The details mentioned here are exemplary and not limiting. Other specific components and manners specific to describing the photo comparison and security process called the Flicker Process 30 may be added as a person having ordinary skill in the field of photographic comparison and security devices, processes and their uses.

FIGS. 1 A through 1 D are sketches of the general Flicker Process 30 concept and applications. This is general overview of the drawings presented. Demonstrated here are: flicker process diagram 31; flicker tracking moved object 34; and flicker process tracking copyright or forgery 36.

Figure 2:
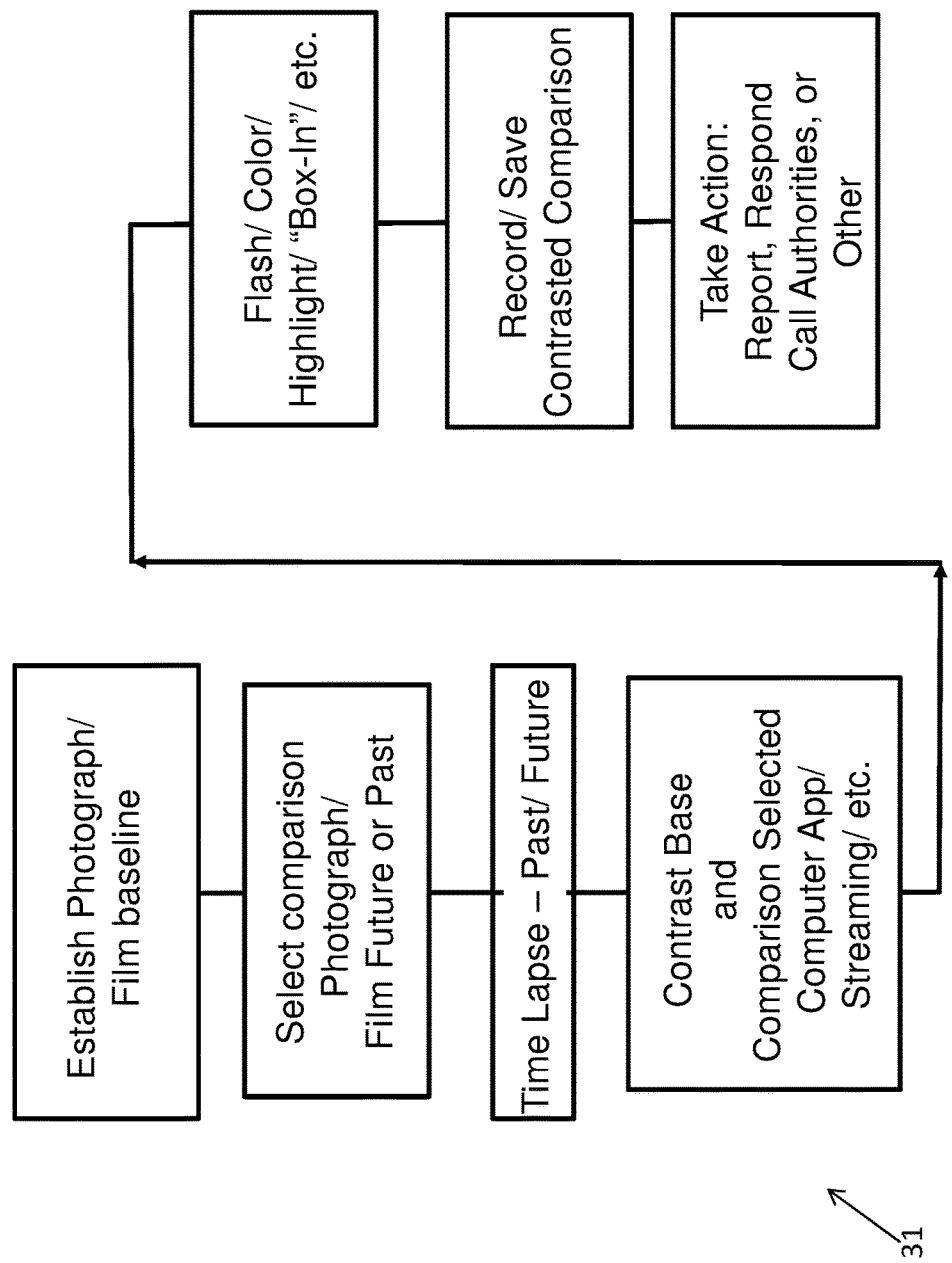
FIG. 2 is a flow diagram of the general Flicker Process with steps noted.

FIGS. 2 A is a flow diagram of the general Flicker Process 30 with steps noted. Here the steps 31 are:
 A. Establish Photograph/Film baseline;
 B. Select comparison Photograph/Film Future or Past;
 C. Time Lapse between the baseline and a comparison frame;
 D. Contrast Base and Comparison Selected Computer App/Streaming/etc.;
 E. Flash/Color/Highlight/"Box-In"/Ghost etc. differences;
 F. Record/Save Contrasted Comparison; and
 G. Take Action: Report, Respond, Call Authorities, or Other.

It is understood, however, that the Flicker process is not limited to only the precise arrangements and instrumentalities shown.

Figure 4:
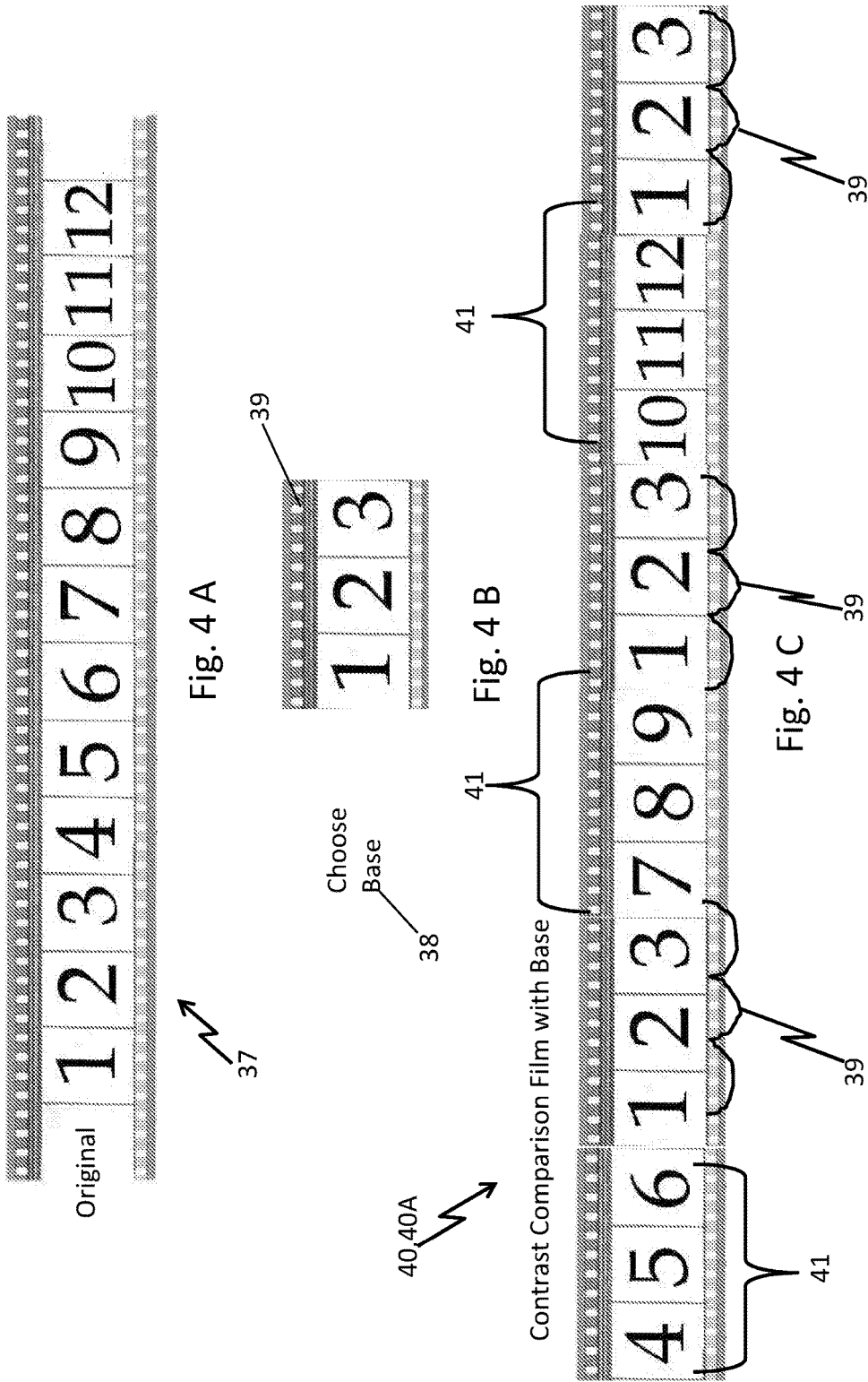
FIGS. 4 A through 4 C are sketches of a film strip concept showing frames, picking a base frame, then doing a contrast comparison of frames with the base.

FIGS. 4 A through 4 C are sketches of a film strip concept showing frames, picking a base frame, then doing a contrast comparison of frames with the base. Shown here are: stream of frames (real time or archived) 37; choose base line frame(s) for comparison 38; base line frame(s) 39; contrast method—repetition of baseline in a stream of future or past frames to denote/flicker 40; contrast method examples: Blink, color highlight, ghost (shift or shadow) 40A; and comparison frame(s) 41. So basically, one chooses a set of frames or a specific base photograph, then puts it into a process computer or application that continuously compares the base frames/photograph with another set of frames/photographs (real time or archival) and the changes flicker or show a difference (ghosting, etc.).

Figure 3:
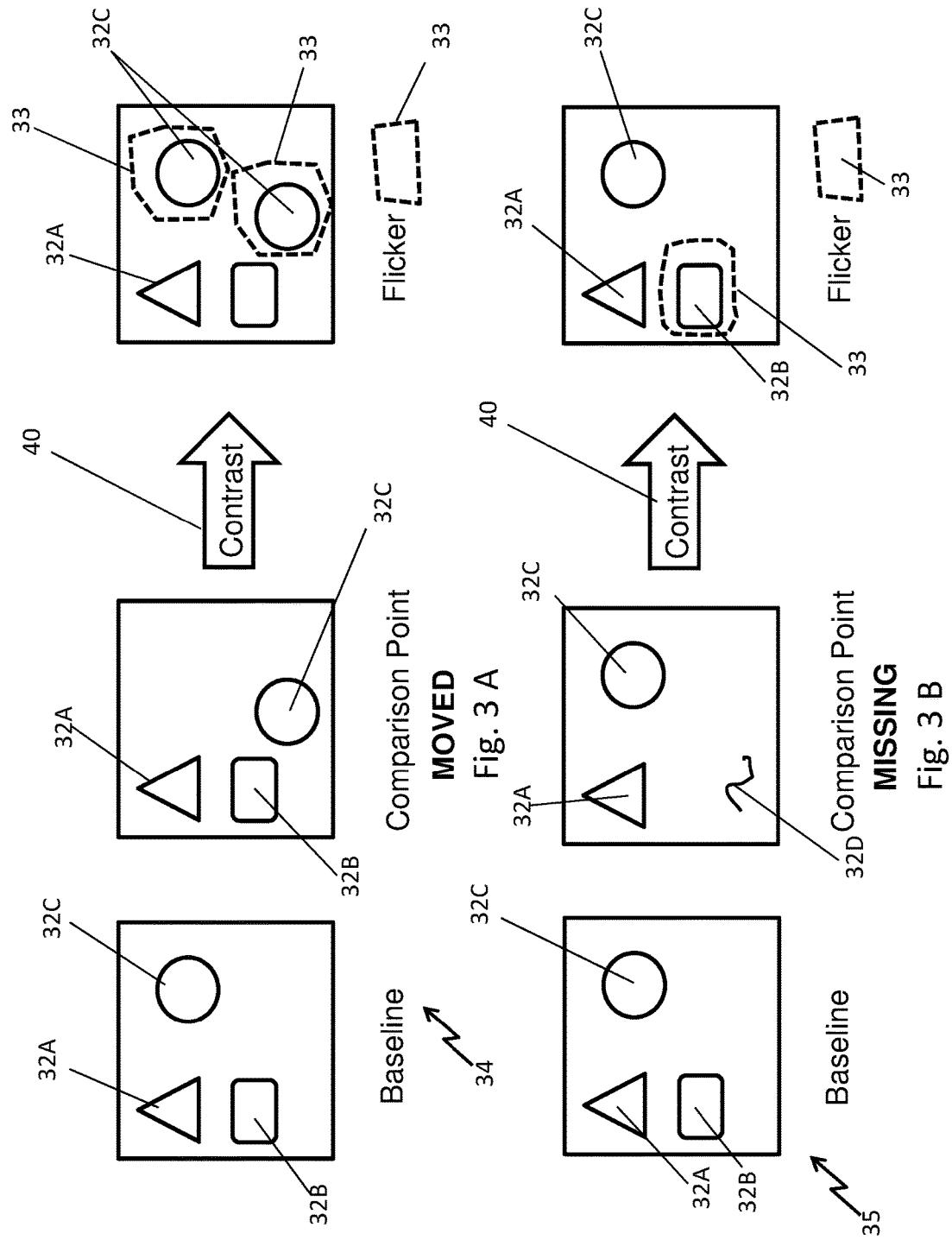
FIGS. 3 A and 3 B are sketches of the Flicker Process tracking moved and missing objects.

FIGS. 3 A and 3 B and FIGS. 5 through 18 are described in the Operations section, below.

The details mentioned here are exemplary and not limiting. Other specific processes, methods, and manners specific to this photo comparison and security process called the Flicker Process 30 may be added to by a person skilled in the art of photograph and film comparison methods and other security and comparative methods and apparatuses.

Operation of the Preferred Embodiment

The new application is for a photo comparison and security process called the Flicker Process Flicker process 30. The preferred embodiment is: A monitoring support process, comprising: A general Flicker Process 30 with steps 31: Step 1: Establish [Photograph/Film] a baseline view; Step 2: Select a comparison view to a baseline view [Photograph/Film] Future or Past; Step 3: Provide a Time Lapse between the baseline vie and a comparison frame view; Step 4: Contrast Baseline view and Comparison view [Selected Computer App/Streaming/etc.]; Step 5: Indicate with a means for identifying [Flash/Color/Highlight/"Box-In"/Ghost etc.] differences of the baseline view and the comparison view; Step 6: Record/Save Contrasted indication of differences of the Baseline view and the Comparison views; and Step 7: Take Action [Report, Respond, Call Authorities, or Other].

FIG. 2 A is a flow diagram of the general Flicker Process with steps noted. But an important additive point is that if two, or sometimes more photos are used and not film/video, then a set "X" amount of time is used between flickers and not a given number of frames. Also, when lining scenes back up, an image and a live view can be used. (For example, to line up the pregnant lady [FIGS. 11]—continuity in a film, the two images are taken with one camera that wasn't necessarily left in place). In addition, two images can be lined up when taken with two different cameras from two different people and then the images sent to a third party to run the flicker process.

One can note that when recording any video/surveillance it doesn't specifically record the flickering or ghosting as shown on the flicker monitor. Video recordings will be Flicker and/or Ghost free. It is the comparison program that adds the Flickering/Ghosting. The output visuals can be changed back and forth from Flicker to Ghosting and vice versa easily and at any time during the viewing. Once all is observed and noted or accounted and deemed to be safe, etc. . . . , the Flickering/Ghosting can be easily reset to current view to incorporate the noted changes. For example, a car parks in a surveyed area and is proper and justifiable, then the reset can be activated to keep the car from Flickering in the view. This will keep new Flickering minimized to new changes and easier to see.

Images being used by the Flicker process 30 do not have to be taken in real time. An archive image can be selected then downloaded into a camera or the like (computer, et al) and used to line up an image to be taken years later from the original. A photo could be taken with one camera then down loaded to a computer, to another phone, tablet and so on, then installed in the second person's device and used to line up once the second photo is shot. The Flicker process 30 could now be run or both images could be sent to a different location and a Flicker run in a remote location, elsewhere. The second image can be run in real-time or not. Flickering can be run by two or more images or one just image with the second view later in real-time.

The Flickering process 30 can be used on any archived mediums: Example watching a medium at 29 frames per second and after pressing reset, frames 1, 2 and 3 are played on the monitor, followed by frames 4, 5 and 6; then back to 1, 2, and 3, followed by frames 7, 8 and 9; the 1, 2 and 3, then 10, 11 and 12; then 1, 2 and 3, followed by 13, 14 and 15 and so on.

This Flicker process 30 compares images from any medium by constantly "Flickering" between them without dissolving at an X amount of time intervals. One notes that Flickering seems to bring the differences out much better and even the smallest details can be seen easier:

For video, a first image can be obtained by capturing it from a software program or by capturing a first image by, alternatively, a reset button.

When comparing just two images, the monitor would Flicker back and forth in an X amount of time between images.

Images may not Flicker but could be two transparent images to compare to. When the two transparent images are combined they form on solid image except where the difference lay.

When comparing a before and after photos, it is very hard to find small differences even when the images are side by side.

When something sparkles or flickers in an image, this tends to be noticed quite easily.

Different methods/ways differences can be seen.

Several modifications to the basic method are anticipated in the scope of this invention:

A. Flickering between two single images.
B. Flickering between X amount of frames in motion medium.
C. Ghosting of both images as an over lay, for comparison.
D. Removing certain colors from one image. Example remove all red from one of the photos and to the other remove all blue, when the photos are over laid or screened over then all the colors come back to original except where differences occur.

FIGS. 3 A and 3 B are sketches of the Flicker Process tracking moved and missing objects. Shown here as an example of the process 31 in operation are: tracked object "A" 32A; tracked object "B" 32B; tracked object "C" 32C; missing space 32D; flicker denoted—flashing, ghosted, color, etc. 33; flicker tracking moved object 34; and flicker tracking missing object 35. One notes that this specific Flicker process 31 is not limited to only the precise arrangements and instrumentalities shown.

Figure 5:
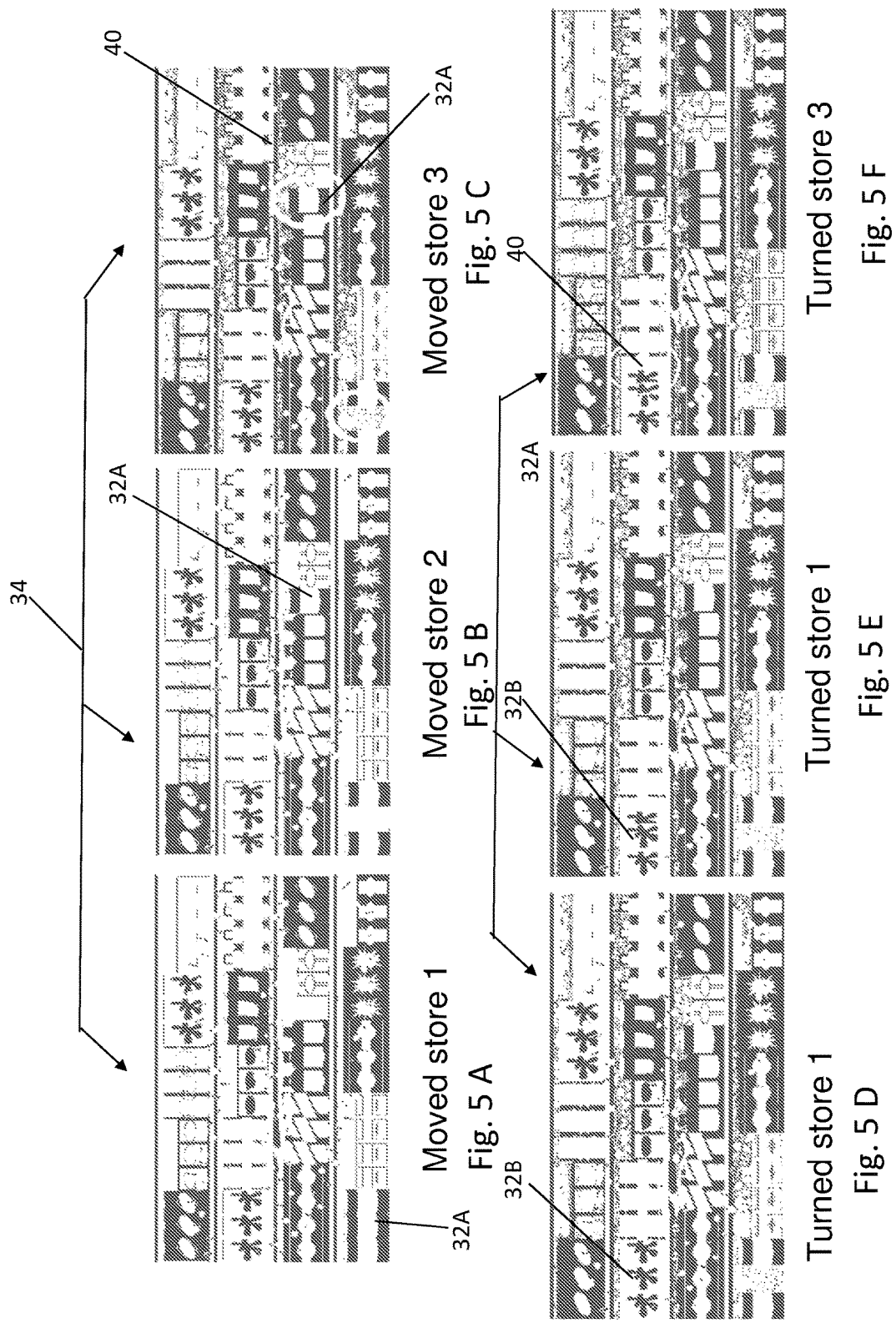
FIGS. 5 A through 5 F are sketches and depiction of an application tracking moved or turned items.

FIGS. 5 A through 5 F are sketches and depictions of an application tracking moved or turned items. Portrayed here are: tracked object "A" 32A; tracked object "B" 32B; tracked object "C" 32C; missing space 32D; flicker tracking moved object 34; and contrast method—repetition of baseline in a stream of future or past frames to denote/flicker 40. Hence, moved, turned, added, or missing objects are quickly and visually enhanced to bring those immediately to the viewer's attention.

Figure 6:
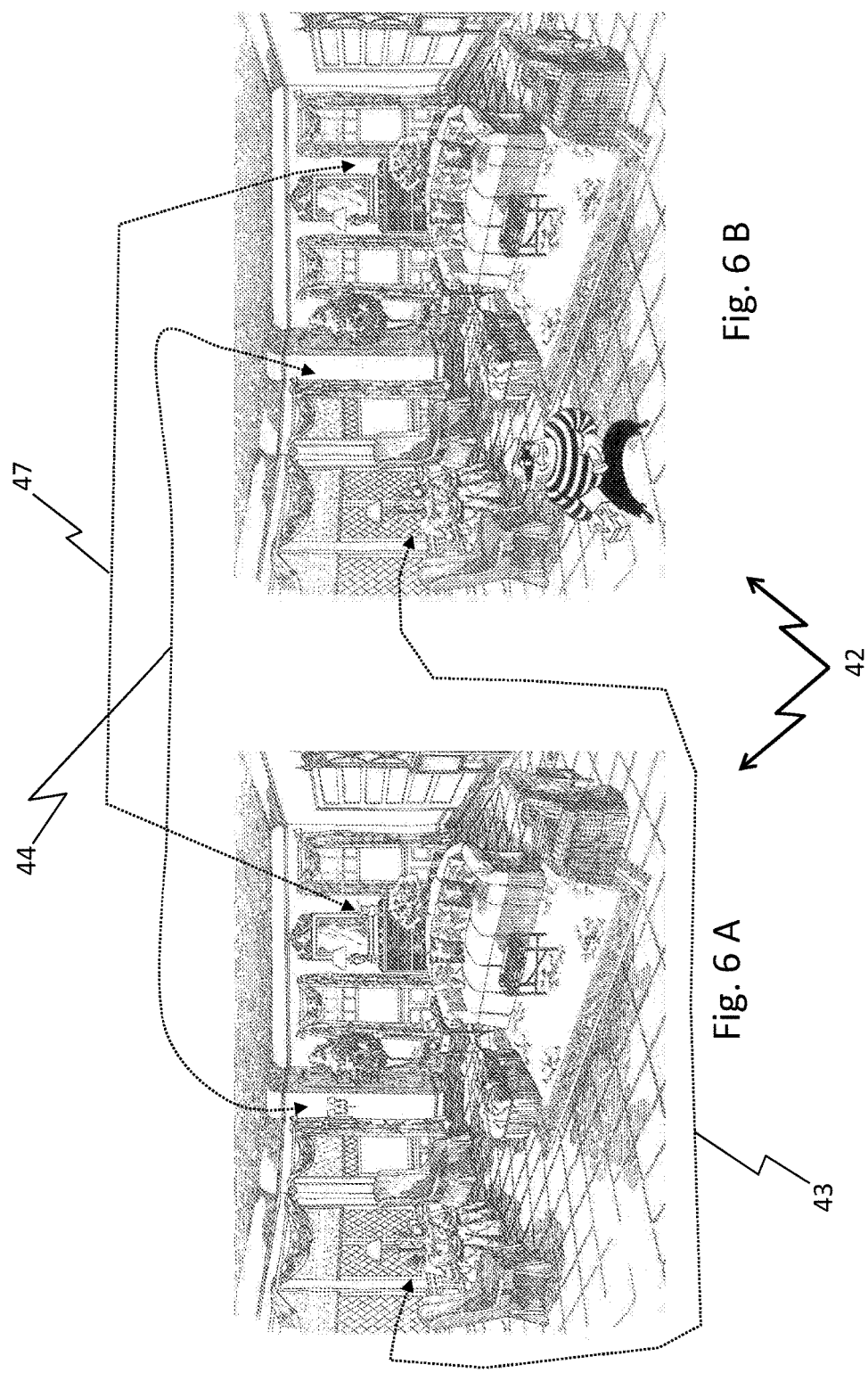
FIGS. 6 A and 6 B show a room surveillance with an intruder.

FIGS. 6 A and 6 B show a room surveillance with an intruder. Demonstrated are: use of flicker with intruder 42; missing vase 43; missing lamp 44; and missing candelabra 47. A security camera or personnel viewing tapes or real time compared to a previous view can see the changes and any missing items.

Figure 7:
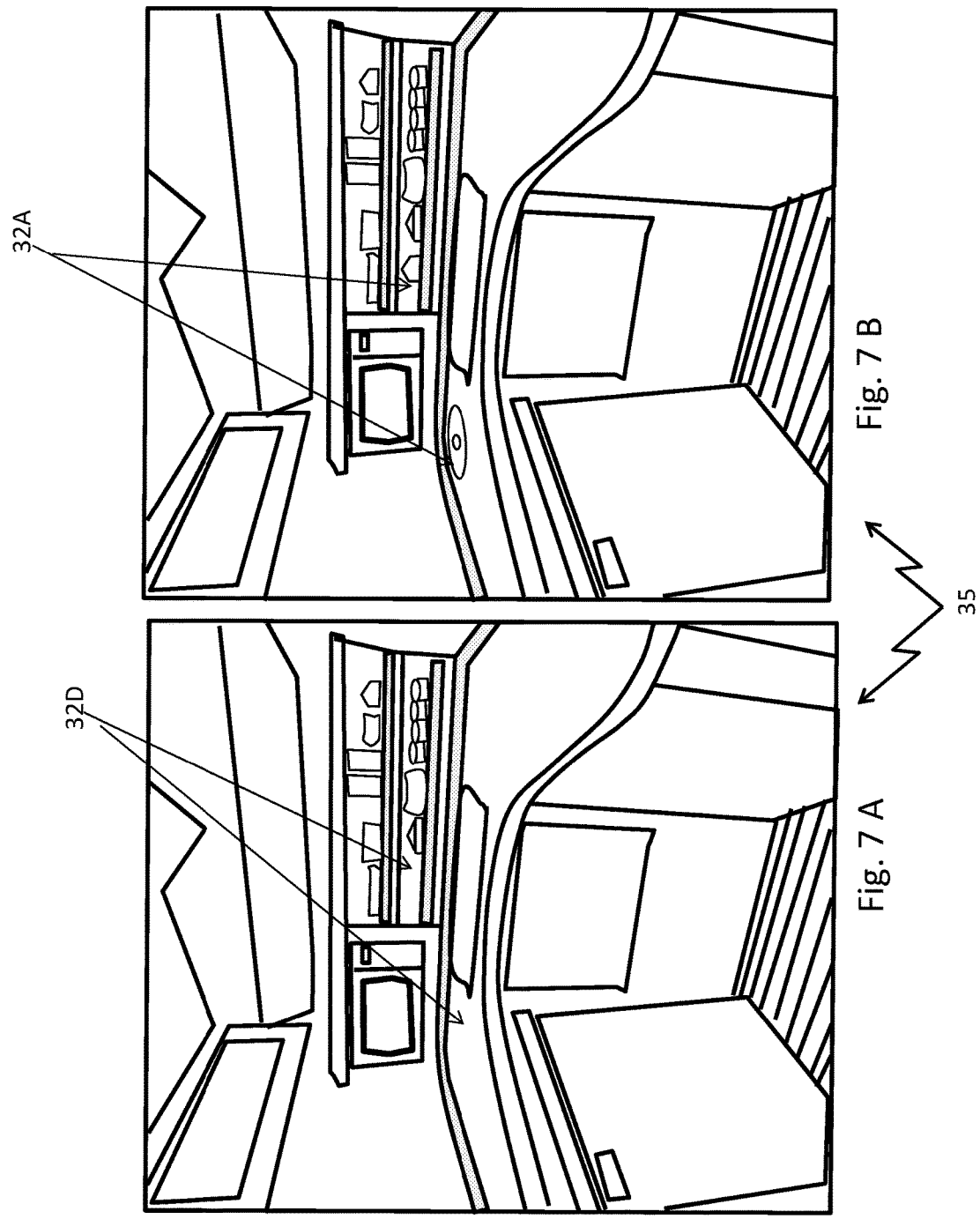
FIGS. 7 A and 7 B are surveillance application showing a missing object.

FIGS. 7 A and 7 B are surveillance application showing a missing object. Shown in these drawings are: tracked object "A" 32A; missing space 32D; and the flicker process 30 tracking missing object 35. Like with the intruder (FIG. 6) personnel viewing tapes or real time compared to a previous view can see the changes and any missing items.

FIGS. 8 A through 8 D are sketches of landscape showing a new bush or suspected change by means of the flicker process 30. These images demonstrate missing space 32D; landscape changes tracked 45 by flicker process 30; and a bush 46. Any changes are quickly and visually indicated for military, homeland security, search and rescue and other needs. FIG. 8 A is baseline from a photograph on one day. Note open area 32D. FIGS. 8 B and 8 C are on the next or subsequent days. A Flikr 30 check reveals a new bush/growth 46 overnight. FIG. 8 D shows that new bush 46 has moved further down the mountain, prompting authorities to do further investigations. When Flickering of the before and after positions (between the movement of the bush), the viewer will see where the bush was to its new location, flickering back and forth between the two positions. If more set points (say initial, a set time after, and another set time after) are used, it is possible then to see which direction the decoy bush is moving no matter how slow it was moving. The slower the decoy bush moves the greater amount of time should be used between set points.

For tracking changes of items like in FIGS. 5 and 7, and surveillance in FIG. 8, one can use previous taken photograph from the same or another camera at any time from the past. The comparison with Flikr 30 can then be used to line up a comparable image/s or motion picture footage. With surveillance needs, Flickering method can set off an alarm or response. Likewise, perceive movement can add a "light ghosting trail" so a viewer can follow movement. For example, if some walks thru the scene and isn't noticed before he is out of sight again, a small ghosting trail can be added to the movement created by the object. This ghosting feature can be turned on, off or fade out at a pre-timed setting. Another name for ghosting is called light painting. A common example is when, in baseball, a pitcher's movement and the ball are tracked to show how the ball traveled.

FIGS. 9 A through 9 C are images of the Flicker process revealing a new star, meteor, comet, planet and etc., the Antarctic ice flows, and Haiti—before and after the earthquake. Flikr 30 can help in engineering of any structural movement of questionable structures. Structures natural or man-made may have movement sensor in certain locations and the structure may move and or deteriorate in known, sensor monitored locations. Shown in these images are astronomy/star changes tracked 80 by flicker process 30; Antarctic ice formations/glacier changes tracked 82 by flicker process 30; and disaster changes (such as the Haiti earthquake or other devastations) tracked 84 by flicker process 30. Physical, geological and astronomical changes are readily viewed using the Flicker process 30. By one using GPS to help line up the before and after photos, the locations may be lined up on photographs and/or motion pictures.

FIGS. 10 A through 10 G are sketches of aerial surveillance application of the Flicker process 30 for dense vegetation and desert applications. Portrayed by these images are: aerial changes 48 tracked by flicker process 30; base topography 49; general changed topography 50; and specific changes in topography 51. Again, any changes are quickly and visually indicated for military, homeland security, search and rescue and other needs by using the Flicker process 30. If a monitor or other image producing device is used, a single person can line up for lineament/s (a linear feature on the earth's surface, such as a fault.) by themselves rather than a crew of two or more surveyors. Also layouts of terrain and buildings can be scaled down to help in making of models and re-creations. Here the Flikr system 30 can line up topography and building locations easier with just a few reference points that may have moved. Plus one using Flikr can even check to see if reference points have moved or shifted location.

Figure 11:
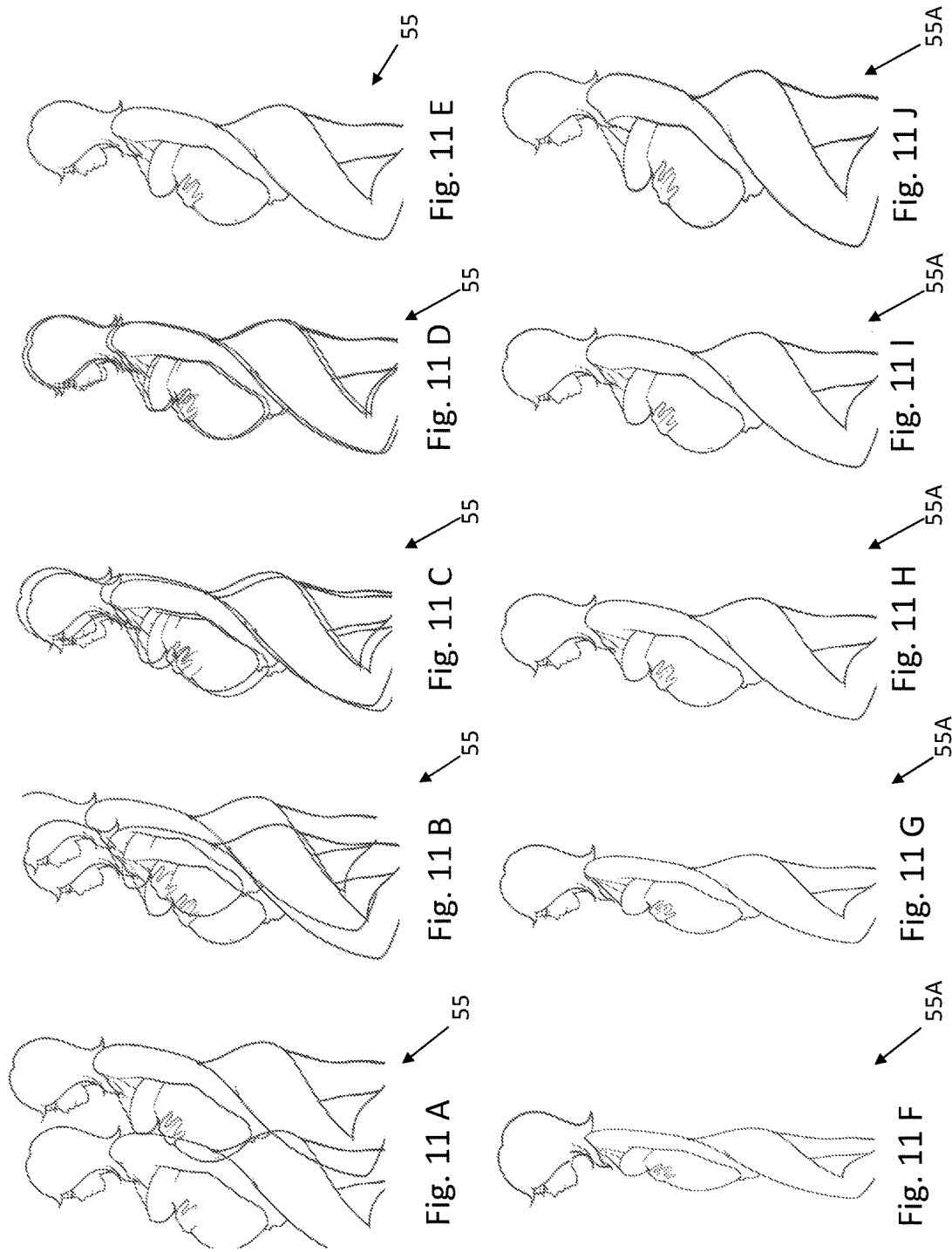
FIGS. 11 A through 11 J are sketches of an overlay of anatomy sketches.
Figure 13:
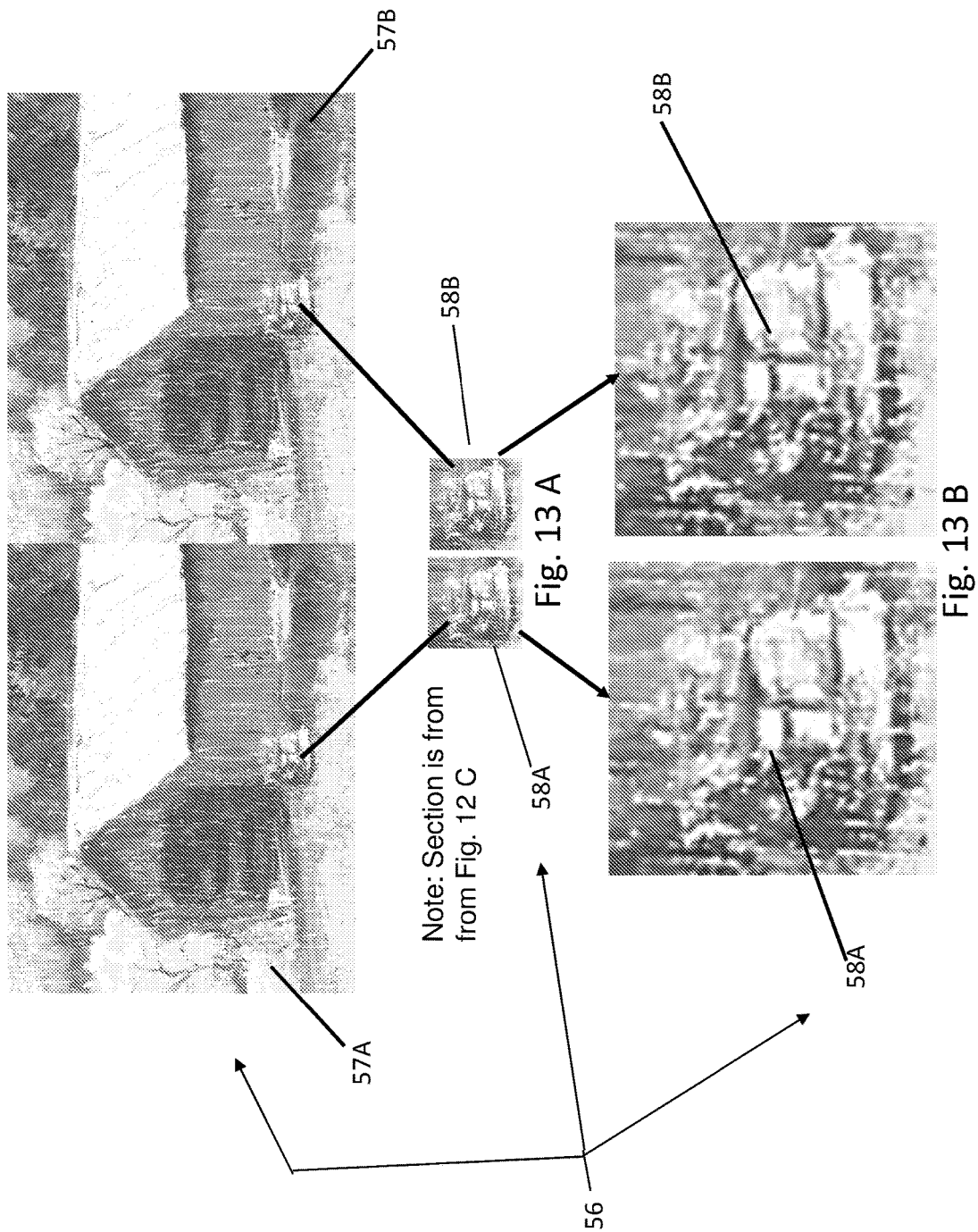
Figure 15:
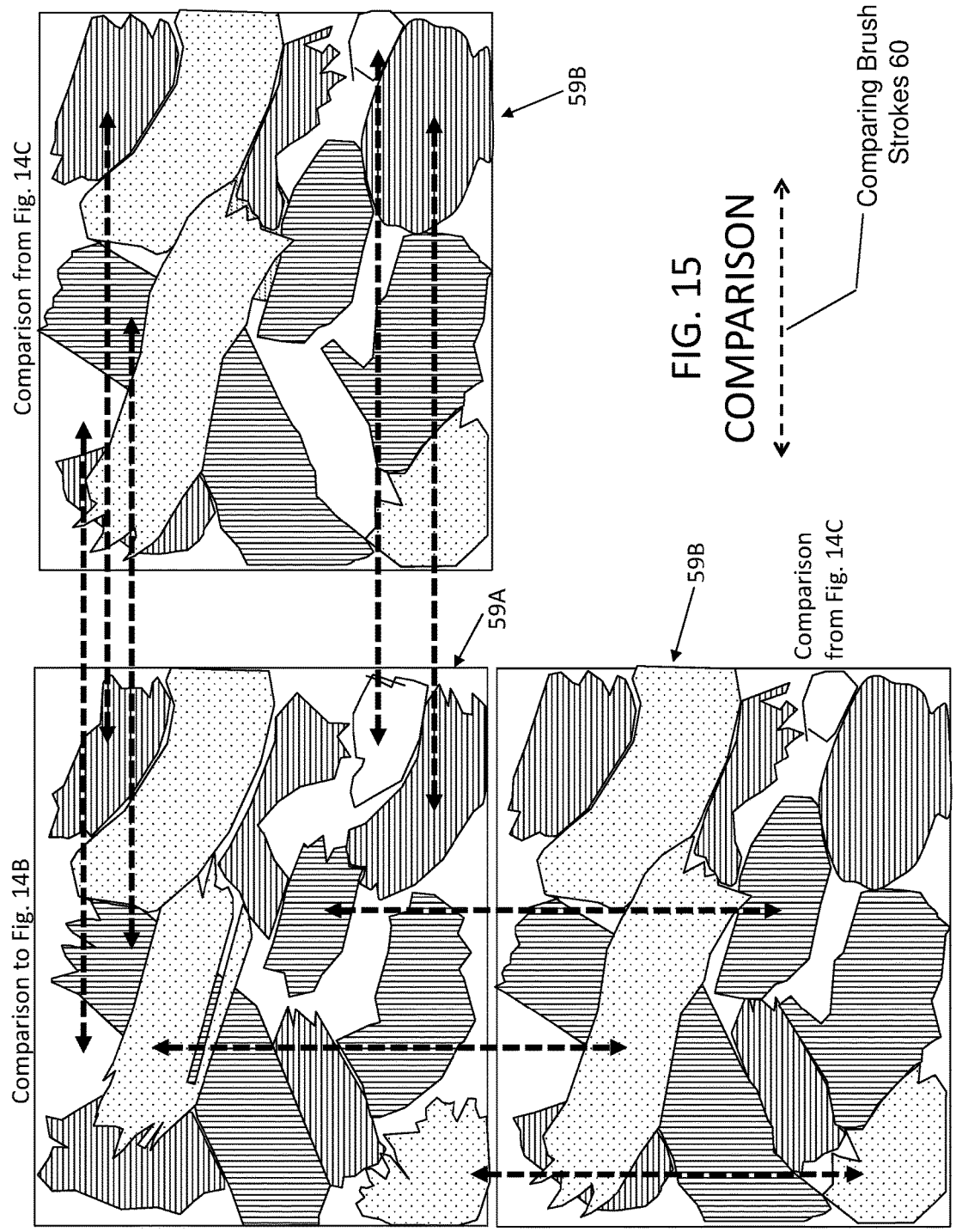

FIGS. 11 A through 11 J are sketches of an overlay of anatomy sketches to precisely realign photographs. FIGS. 11 A through 11 E are sketches to precisely realign the previous photograph taken to the real-time view. In this case, a ghostly/transparent view of the previous photo taken in that last series will appear on the screen to help realign the anatomic changes. FIGS. 11 A-11 E demonstrate precise alignment overlay and FIGS. 11 F-11 J show anatomy changes. Here are shown: tracking and annotated changes or overlay 55 by the flicker process 30 and anatomy changes for the body of a person, for example a pregnant woman 55A.

FIGS. 12 A through 12 C, 13 A and 13 B, 14 A though 14 C and 15 are successive blow ups using the Flicker process 30 to track a painting or prints to show copyright infringement or forgery. Demonstrated in these images and sketches are: tracking forgeries or copyright 56 by the flicker process 30; a painting A 57A; another painting B 57B; a suspected section 58A of painting A 57A; the same suspected section 58B of painting A 57B; an enlarged suspect section 59A; the corresponding enlarged suspect section 59B; and comparing brush strokes 60 by flicker process 30 to determine if there is a forgery or copyright infringement. One notes by enlarging the photos and introducing the Flicker process 30, the dimensions, brush stroke flow, color and densities are readily seen for comparison and detection. As another feature, three dimensional characteristics can be monitored with Flikr 30. The established X (width), Y (height), and Z (depth) values (3D) could help in determining the height and depths of the brush strokes.

Figure 16:
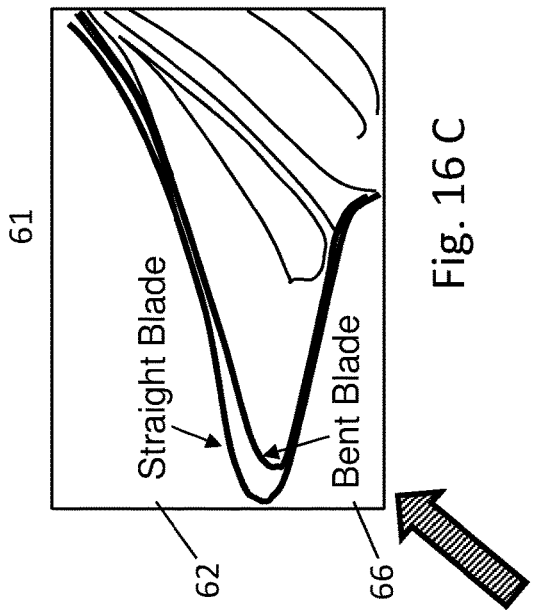
FIGS. 16 A through C and 17 A1, A2, B1, B2 and C are sketches of Flicker process used to show misaligned or bent fan blades.
Figure 16:
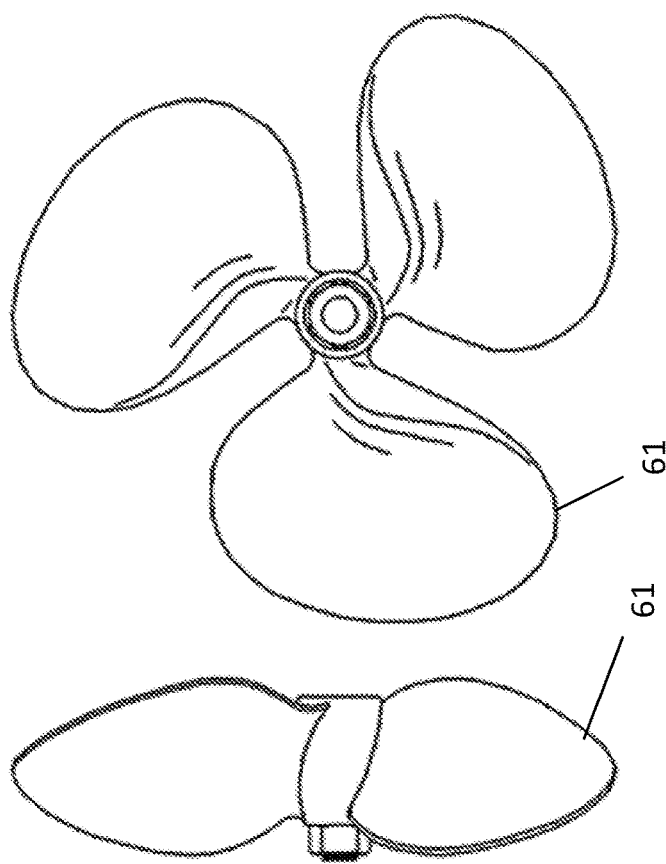
Figure 16:
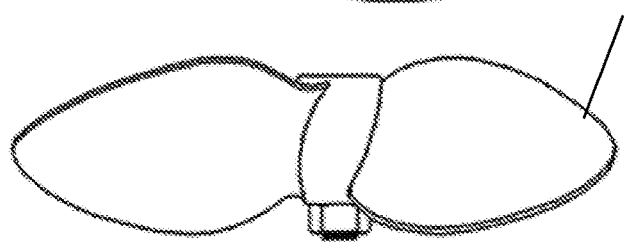

FIGS. 16 A through C and 17 A1, A2, B1, B2 and C are sketches of Flicker process 30 used to show misaligned or bent fan blades. In these sketches are shown: fan with blades 61; straight blades 62; bent blade 66; and a comparing of the mechanical positions 70 by tracking with flicker process 30. Here, mechanical and dynamic alignment of machine parts may be easily viewed using the Flicker process 30. The process 30 can be used tracking of machine that do the same operations over and over to help with such as tolerances or improper movements. Also, parts from machines and be flickered to a good acceptable part to all other parts that been made to see even the smallest differences. This quick comparison method can help a lot in engineering. Likewise when aligning parts or viewing small details, the process 30 can show where to exactly put a replacement object, part etc. This is critical in exacting placement such as in equal load displacement that may have taken a long time to first figure out before from trial and error.

FIGS. 18 A through 18 D are using the process 30 to compare medical records such as x-rays and eye scans that show changes such as vein or artery changes. Demonstrated by FIGS. 18 A and 18 B are images comparing medical tests x-rays, CAT and PET Scans or the like 72 by flicker process 30 and medical test view of organ or anatomical parts 74. FIGS. 18 C and 18 D are images comparing eye scans 76. This shows vein or artery changes 78. These two simple examples indicates the plethora of ways the Flicker process 30 may aid the medical industry. The Flicker process 30 can be used to check differences in non-visuals, such as oscilloscopes, audio scopes display comparing two or more displays.

There are several potential uses for the photo comparison and security process 30 called the Flicker Processing. These examples, and not limitations, of uses for this process 30 are:

1. Missing items off of store shelves.
2. Missing items at home.
3. Comparing "X-rays".
4. Survey Intruders.
5. Detecting forgeries. The more the two images are blown up the more detail will start to flicker.
6. Aligning fan blades.
7. Moving object that have been moved back to the exact place they were.
8. Showing progression of an object or person growing such as a woman's pregnancy.
9. Before and after photos of many things such as, glaciers.
10. Compare landscapes to see if anything changed. Example if a sniper was to moving in slow enough as not to be detected behind a portable shrub, the new shrub would be detected as two different flickers one where it used to be and the where it moved to.
11. Aerial photos, by aligning the two photos, any difference would flicker. Could detect a new area of brush that could not have grown that quickly.
12. Astronomy, billions of stars in the sky, if one new object was to appear just as just as bright as the average star light, it would most likely go undetected by just comparing side by side. Maybe an expensive algorithm program could detect it or just use the flicker method.
13. Compare computer programs in the program language line for line.
14. Keep track of volcanos for the smallest amount of bulging.

15. Keep track of glaciers for the smallest amount of ice shift/movement.
16. One or more of the Flikr methods can be used to help recreate a past movie set or photograph down to the finest details.

With this description it should be understood that the photo comparison and security process called the Flicker Process 30 is not to be limited to only the disclosed embodiment of product. The features of the photo comparison and security process called the Flicker Process 30 are intended to cover various modifications and equivalent arrangements included within the spirit and scope of the description.

Unless defined otherwise, all technical and scientific terms used herein have the same meaning as commonly understood by one of ordinary skills in the art to which these inventions belong. Although any methods and materials similar or equivalent to those described herein can also be used in the practice or testing of the present inventions, the preferred methods and materials are now described. All patents and publications mentioned herein, including those cited in the background of the application, are hereby incorporated by reference to disclose and described the methods and/or materials in connection with which the publications are cited.

The publications discussed herein are provided solely for their disclosure prior to the filing date of the present application. Nothing herein is to be construed as an admission that the present inventions are not entitled to antedate such publication by virtue of prior invention. Further, the dates of publication provided may be different from the actual publication dates which may need to be independently confirmed.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

Thus the scope of this invention should be determined by the appended claims and their legal equivalents. Therefore, it will be appreciated that the scope of the present invention fully encompasses other embodiments which may become obvious to those skilled in the art and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claims.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing FIGS. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed is:

1. A photo comparison and security process, for monitoring a change, comprising:
   Step 1: Establishing an archived baseline view;
   Step 2: Selecting a real-time comparison view to the archived baseline view;
   Step 3: Providing a time lapse between the archived baseline view and the real-time comparison view;
   Step 4: Providing a three-dimensional method to contrast the archived baseline view and the real-time comparison view;
   Step 5: Indicating the differences with a means for identifying the differences of the archived baseline view and the real-time comparison view;
   Step 6: Recording and saving contrasted indication of differences of the archived baseline view and the real-time comparison views; and
   Step 7: Taking action
   wherein the photo comparison and security process, for monitoring a change, provides recognition of changes, provides a record for future security use and litigation, and is a real-time comparison;
   wherein the photo comparison and security process can track missing items off of store shelves and missing items at home for both security and inventory and can survey intruders and moving objects in a store or building;
   wherein the photo comparison and security process can detect forgeries with indicating differences in a difference in a group of details of two enlarged images;
   wherein the photo comparison and security process can compare a movement in glaciers, a change in landscapes before and after, a change in aerial photos of a desert, a forest, or mountain terrain; and
   wherein the photo comparison and security process can compare computer programs in the program language line for line to detect changes.

2. The photo comparison and security process according to claim 1 wherein the establishing the archived baseline view is through a photograph.

3. The photo comparison and security process according to claim 1 wherein the establishing the archived baseline view is through a film and video.

4. The photo comparison and security process according to claim 1 wherein the comparison view to the archived baseline view is a comparison of photographs.

5. The photo comparison and security process according to claim 1 wherein the comparison view to the archived baseline view is a comparison of films and videos.

6. The photo comparison and security process according to claim 1 wherein the providing a three-dimensional method to contrast the archived baseline view and the real-time comparison view is a computer application.

7. The photo comparison and security process according to claim 1 wherein the providing a three-dimensional method to contrast the archived baseline view and the real-time comparison view is a streaming video.

8. The photo comparison and security process according to claim 1 wherein the means for identifying differences of the archived baseline view and the real-time comparison view is selected from a group consisting of a flash method, a color scheme, a highlighting of the changes method, a box-in method, and a Ghost imagery method.

9. The photo comparison and security process according to claim 1 wherein the step taking action is making a report.

10. The photo comparison and security process according to claim 1 wherein the step taking action is responding to the action.

11. The photo comparison and security process according to claim 10 wherein the responding to the action is a calling authorities.

12. The photo comparison and security process according to claim 1 wherein the method to contrast the archived baseline view, at any time from the past, and the real-time comparison view photograph and compares an image(s) or motion picture footage in a present and real-time time.

13. A photo comparison and security process, for monitoring a change, comprising:
   Step 1: Establishing an archived photograph baseline;
   Step 2: Selecting a real-time comparison photograph;
   Step 3: Providing a time lapse between the archived photograph baseline and the real-time comparison photograph;
   Step 4: Contrasting the differences between the archived baseline photograph and the real-time comparison photograph using a selected computer application or streaming application;
   Step 5: Indicating the differences with a means for identifying differences;
   Step 6: Recording and saving the contrasted differences; and
   Step 7: Taking action
   wherein the photo comparison and security process, for monitoring a change, provides recognition of changes, provides a record for future security use and litigation, and is a real-time comparison;
   wherein the photo comparison and security process can track missing items off of store shelves and missing items at home, can survey intruders and moving objects in a store or building;
   wherein the photo comparison and security process can detect forgeries with indicating differences in a difference in a group of details of two enlarged images;
   wherein the photo comparison and security process can compare a movement in glaciers, a change in landscapes before and after, a change in aerial photos of a desert, a forest, or mountain terrain; and
   wherein the photo comparison and security process can compare computer programs in the program language line for line to detect changes.

14. A photo comparison and security process, for monitoring a change, comprising:
   Step 1: Establishing an archived film or video baseline;
   Step 2: Selecting a real-time comparison later film or video;
   Step 3: Providing a time lapse between the film or video archived baseline and the real-time comparison film or video;
   Step 4: Contrasting the differences between the archived baseline film or video and the real-time comparison later film or video using a selected computer application or streaming application;
   Step 5: Indicating the differences with a means for identifying differences;
   Step 6: Recording and saving the contrasted differences; and
   Step 7: Taking action wherein the photo comparison and security process, for monitoring a change, provides recognition of changes, provides a record for future security use and litigation, and is a real-time comparison.

15. The photo comparison and security process in claim 13 wherein the means for identifying differences is selected from a group consisting of a flashing indicator, a color scheme, a highlighting of the changes, a "box-in", and a Ghost imagery.

16. The photo comparison and security process in claim 13 wherein the means for identifying differences is selected from a group consisting of a flashing indicator, a color scheme, a highlighting of the changes, a "box-in", and a Ghost imagery.

* * * * *